United States Patent [19]

Nakahi et al.

[11] Patent Number: 5,280,631
[45] Date of Patent: Jan. 18, 1994

[54] POLARIZATION DIVERSITY SYSTEM SUITABLE FOR RADIO COMMUNICATION IN INDOOR SPACE

[75] Inventors: Kazuo Nakahi; Hiroshi Umeyama; Shigemi Sakurai; Kuniharu Tatetsuki, all of Kadoma, Japan

[73] Assignee: Matsushita Electric Works, Ltd., Osaka, Japan

[21] Appl. No.: 845,534

[22] Filed: Mar. 4, 1992

Related U.S. Application Data

[63] Continuation of Ser. No. 366,542, Jun. 15, 1989, abandoned.

[30] Foreign Application Priority Data

Jun. 15, 1988 [JP] Japan .................................. 63-148864
Jun. 15, 1988 [JP] Japan .................................. 63-148865

[51] Int. Cl.$^5$ .............................................. H04B 1/02
[52] U.S. Cl. .................................. 455/65; 455/67.6; 455/101; 455/269; 343/742; 343/853
[58] Field of Search ............................ 455/41, 59-60, 62, 65, 67.1, 67.6, 101, 129, 269; 343/702, 742-744, 853

[56] References Cited

U.S. PATENT DOCUMENTS

| | | | |
|---|---|---|---|
| 3,111,668 | 11/1963 | Kuecken | 455/101 |
| 3,922,685 | 11/1975 | Opas | 455/101 |
| 4,433,336 | 2/1984 | Carr | 343/742 |
| 4,513,412 | 4/1985 | Cox | 455/101 |
| 4,599,734 | 7/1986 | Yamamoto | 455/101 |
| 4,647,937 | 3/1987 | Hidaka et al. | 343/743 |
| 4,742,568 | 5/1988 | Furuya | 455/277 |

FOREIGN PATENT DOCUMENTS 54-110714  8/1979  Japan .
56-98036   8/1981  Japan .

OTHER PUBLICATIONS

"Polarization Diversity System for Mobile Radio", IEEE Transactions on Communications, vol. COM-20, No. 5, Oct. 1972.

*Primary Examiner*—Jin F. Ng
*Assistant Examiner*—Andrew Faile
*Attorney, Agent, or Firm*—Leydig, Voit & Mayer

[57] ABSTRACT

A polarization diversity radio communication system suitable for radio communication in indoor space is provided for transmitting from a transmitter a series of data sequentially from one of two or more transmission antennas of the transmitter, and for reproducing the data received at a receiver through a single reception antenna of the receiver when the series data are received from the transmitter. Thus, the transmitted data from any part of the indoor space can be received efficiently, and a high S/N ratio can be assured on the reception side.

6 Claims, 7 Drawing Sheets

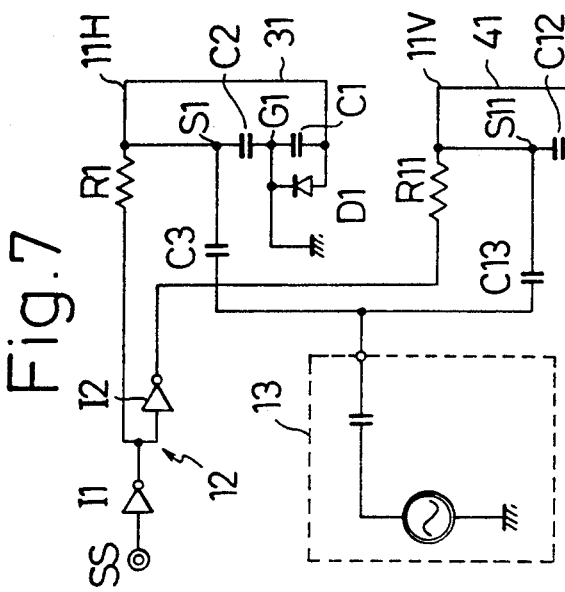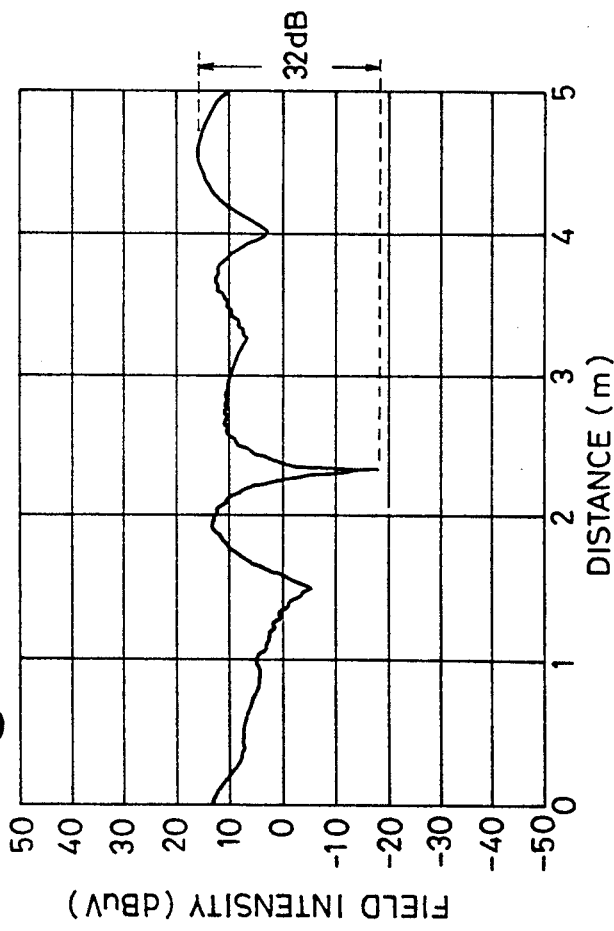

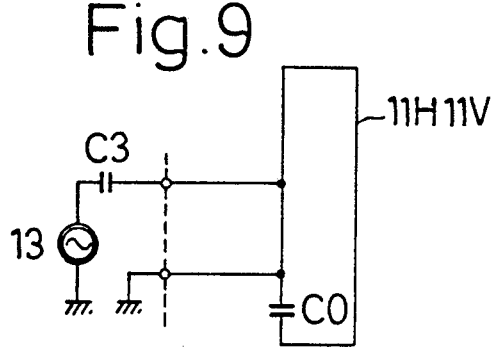
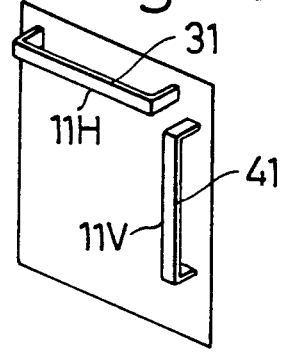
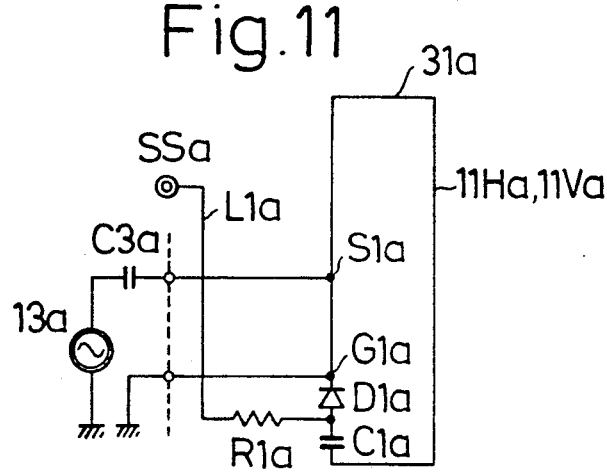
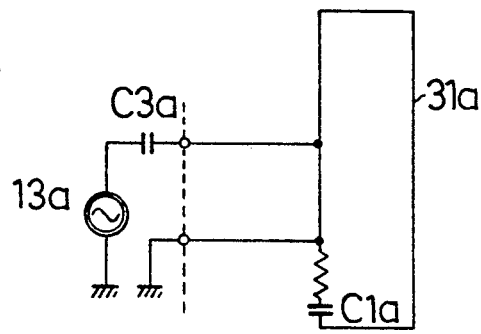
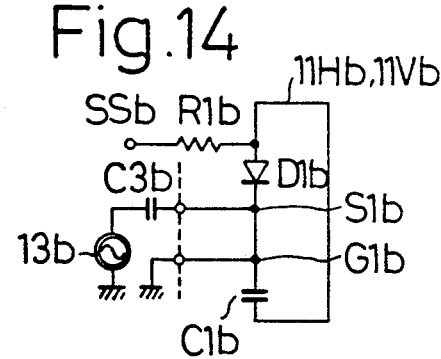
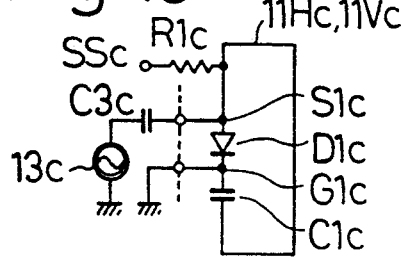
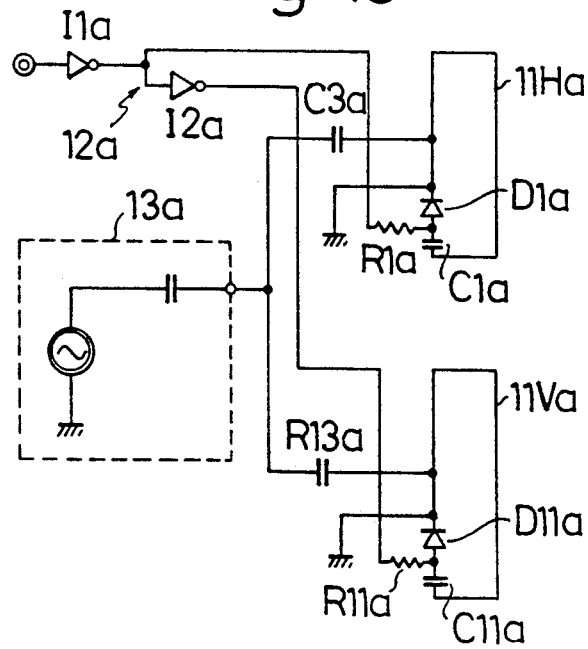

Fig. 19
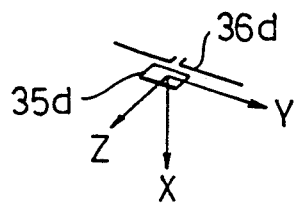
Fig.20(a)  Fig.21(a)  Fig.22(a)  Fig.23(a)
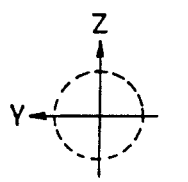 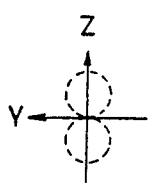 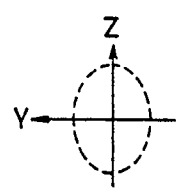 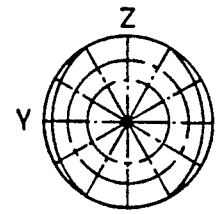
Fig.20(b)  Fig.21(b)  Fig.22(b)  Fig.23(b)
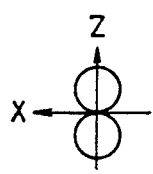 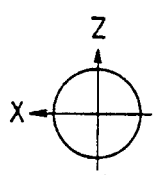 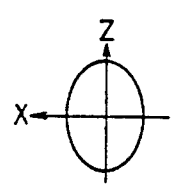 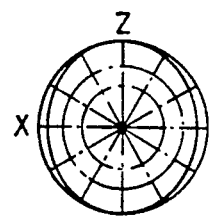
Fig.20(c)  Fig.21(c)  Fig.22(c)  Fig.23(c)
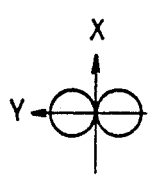 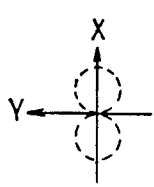 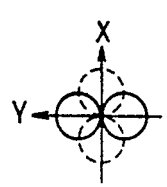 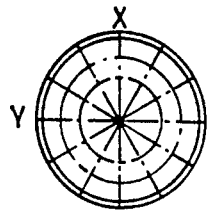

POLARIZATION DIVERSITY SYSTEM SUITABLE FOR RADIO COMMUNICATION IN INDOOR SPACE

This application is a continuation of application Ser. No. 07/366,542, filed Jun. 15, 1989 abandoned.

TECHNICAL BACKGROUND OF THE INVENTION

This invention relates to a polarization diversity radio communication system including a plurality of transmission antennas of different main polarization components and a reception antenna for receiving transmitted waves from the respective transmission antennas.

DISCLOSURE OF PRIOR ART

In recent years, radio communication systems employing electric waves as communicating media have been increasingly utilized in indoor spaces. When the electric waves propagate through free space, radiation field intensity of the antenna shows a monotonous decrease as the distance increases. In the indoor space, however, the electric wave is readily caused to reflect in a complicated manner thus producing many propagation paths. also, multipath fading results due to phase difference of the electric wave at the respective propagation paths.

In view of the above problem, there has been suggested in, for example, Japanese Patent Application Laid-Open Publication No. 54-118117 of Y. Nakano a space diversity radio communication system, in which two or more reception antennas are provided as mutually spaced within an indoor space, and the system is so arranged as to obtain a relatively large reception signal from the electric wave received at one of the reception antennas at a required field intensity and through a change-over operation at a reception circuit connected to the reception antennas. With this arrangement, the reception can be carried out without suffering from any multipath fading due to the phase difference of the electric wave passing the respective propagation paths, and the reception of the electric wave coming from any part of the space can be attained.

In the space diversity system, it is necessary to have the two or more reception antennas disposed mutually spaced by such a predetermined distance as 0.4 wave length, for example, 40 cm with respect to the electric wave of 300 MHz, so that a receiver including the reception antennas has to be enlarged in its dimension, and there arises a problem in respect of occupation space as the receiver of the radio communication system to be employed in the indoor space. Further, it is another problem that the change-over operation in the reception circuit, with respect to the two or more reception antennas, is likely to be accompanied by a larger loss, and no sufficient S/N ratio can be attained on the reception side.

It has been further suggested in, for example, Japanese Patent Application Laid-Open Publication No. 56-98036 by Y. Ogata et al to employ a polarization diversity radio communication system provided with two or more reception antennas of different main polarization components, according to which the reception object is the different main polarization components of the transmitted electric wave so that no interval between the antennas installed is needed. In this configuration the reception antennas are able to be disposed closer and a minimization in size of the receiver can be realized. However, the loss at the reception circuit upon signal composition at the reception circuit becomes higher in this case, too, and there remains the problem that the S/N ratio on the reception side still cannot be made sufficiently high.

TECHNICAL FIELD

A primary object of the present invention is, therefore, to provide a polarization diversity radio communication system which allows the transmission from any part of an indoor space to be excellently received without suffering from any multipath fading due to the phase difference of the electric wave at every path within the indoor space where the system is employed, and its receiver to be sufficiently minimized in size and to be likewise lowered in manufacturing cost while assuring a high S/N ratio.

According to the present invention, the above object can be realized by a polarization diversity radio communication system for transmission of radio signals, which comprises a transmitter including a plurality of antennas of different main polarization components, a transmission circuit, and an antenna change-over circuit connecting the transmission circuit to select one of the transmission antennas for sequentially selecting the antennas and transmitting a series of data from the respective transmission antennas; and a receiver separated properly from the transmitter and including a single reception antenna for reproducing the series of data from the transmitter upon reception of the series data.

Other objects and advantages of the present invention shall be made clear in following description of the invention detailed with reference to embodiments shown in accompanying drawings.

BRIEF EXPLANATION OF THE DRAWINGS

FIG. 3 is an explanatory view for transmission signals from the transmitter of FIG. 1;

FIGS. 4 to 6 are diagrams respectively showing the relationship between the distance with respect to the respective transmission antennas of the transmitter in FIG. 1 and the field intensity;

FIG. 7 is an equivalent circuit diagram to FIG. 1 but in the transmitter of the latter of which the transmission antennas are made to be integral with switches;

FIG. 8 is a circuit diagram of the transmission antennas in the transmitter of FIG. 1;

FIG. 9 is an equivalent circuit diagram of the transmission antennas of FIG. 8;

FIG. 10 is a schematic perspective view showing practical mounting state of the transmitter of FIG. 1;

FIG. 11 is a circuit diagram of the transmission antennas in another working aspect in which the antennas are made integral with a switch in the transmitter employed in the system according to the present invention;

FIG. 12 is an equivalent circuit to the transmission antenna of FIG. 11;

FIG. 13 is a circuit diagram of the transmitter employing the transmission antennas of FIG. 11;

FIGS. 14 and 15 are circuit diagrams showing the transmission antennas in other working aspects in the transmitter employed in the system according to the present invention;

FIG. 19 is a schematic explanatory view for the transmission antennas of FIG. 16;

FIGS. 20(a) to 20(c) through FIGS. 23(a) to 23(c) are explanatory views for the operation of the transmission antennas of FIG. 16;

While the present invention shall now be explained with reference to the embodiments shown in the accompanying drawings, it should be appreciated that the intention is not to limit the invention only to the embodiments shown but to rather include all modifications, alterations and equivalent arrangements possible within the scope of appended claims.

DISCLOSURE OF PREFERRED EMBODIMENTS

Figure 1:
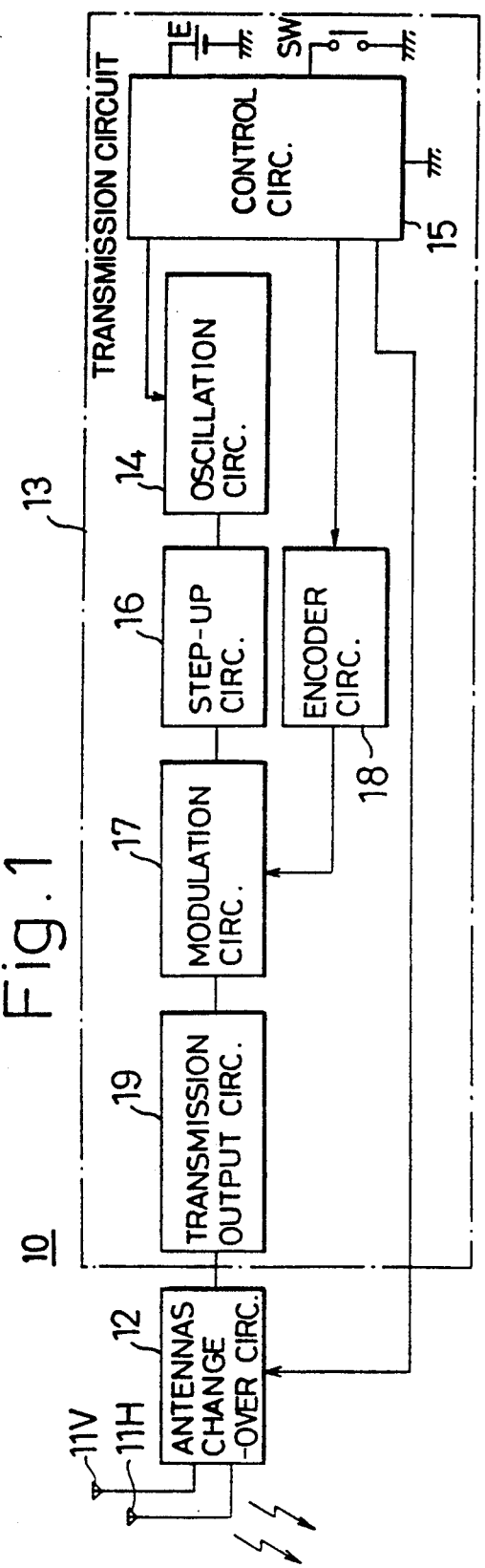
FIG. 1 is a basic block diagram of the transmitter in the polarization diversity radio communication system according to the present invention.
Figure 2:
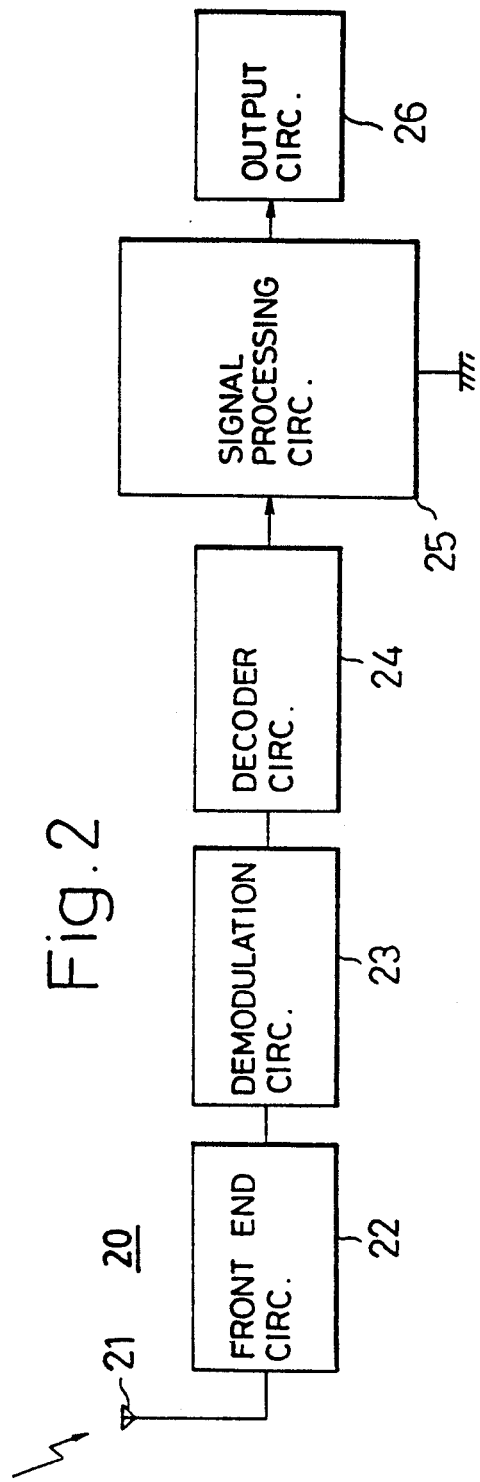
FIG. 2 is a basic block diagram of the receiver in the polarity diversity radio communication system according to the present invention.

Referring to FIGS. 1 and 2, there are shown in the block diagrams the transmitter and receiver in the polarization diversity radio communication system according to the present invention. In the transmitter 10 shown in FIG. 1, a pair of transmission antennas 11H and 11V are included, and an antenna change-over circuit 12 which selects one of the antennas 11H and 11V as well as a transmission circuit 13 which generates a transmission output are connected to the antennas 11H and 11V. The transmission circuit 13 includes an oscillation circuit 14 which comprises a crystal oscillator that oscillates at a constant frequency. This oscillation circuit 14 oscillates as an output of a control circuit 15 is received to provide an oscillation output through a step up circuit 16 to a modulation circuit 17 as raised to a desired frequency at the step up circuit 16. A digital signal is being provided from the control circuit 15 to the modulation circuit 17 through an encoder circuit 18 so that the oscillation output will be thereby modulated at the circuit 17 and then power-amplified at a transmission output circuit 19, and the power-amplified output can be transmitted out of one of the transmission antennas 11H and 11V which is selected by the antenna change-over circuit 12. In this case, the control circuit 15 is connected to a power source E, while a switch SW or the like for the purpose of, for example, an emergency alarm can be connected to the control circuit 15 so that, when the switch SW is operated, the control circuit 15 will be driven. Further, a control output is provided from the control circuit 15 to the antenna change-over circuit 12 so that the antenna change-over operation will be carried out in conformity to the oscillation and modulation. It may be possible to connect, alternatively, to the control circuit 15 such disaster-preventive sensor as a fire detector, a crime-preventive sensor or the like.

The transmission antennas 11H and 11V are so set that the main polarization components of their output electric waves mutually intersect at right angles, so that signals of different polarization components can be transmitted at different times from the both antennas 11H and 11V with their change-over operation carried out by the antenna change-over circuit 12.

The receiver 20 includes, on the other hand, a single reception antenna 21 to which a front-end circuit 22 which amplifies a reception signal, a demodulation circuit 23 which demodulates the modulated signal, and a decoder circuit 24 are connected, so that the transmitted signal originated from the control circuit 15 and encoded at the encoder circuit 18 will be reproduced and provided to a signal processing circuit 25 as its input. An output circuit 26 is connected to this signal processing circuit 25 so that an indication or alarm will be executed depending on contents of the reception signal.

Referring in detail to the operation of the transmitter 10 and receiver 20, the transmitter 10 prepares first the data to be transmitted such that a series of data are made as a unit and two sets of data of the same contents are prepared for every unit. That is, as the switch SW is operated, two sets of the data of the same contents are formed at the control circuit 15 into first and second frames F1 and F2 as shown in FIG. 3(a). In this case, the contents of the first and second frames F1 and F2 are constituted by digital signals as shown in FIG. 3(b), and the series of data in the first frame F1 are transmitted in a state where one of the two transmission antennas, for example, the antenna 11H is selected by the antenna change over circuit 12 while the series of data in the second frame F2 are transmitted in a state where the other transmission antenna 11V is selected. In this manner, the data sets of the same contents are to be transmitted at different time with different polarization components contained, so that a data transmission of the polarization diversity radio communication system can thereby be realized.

Figure 5:
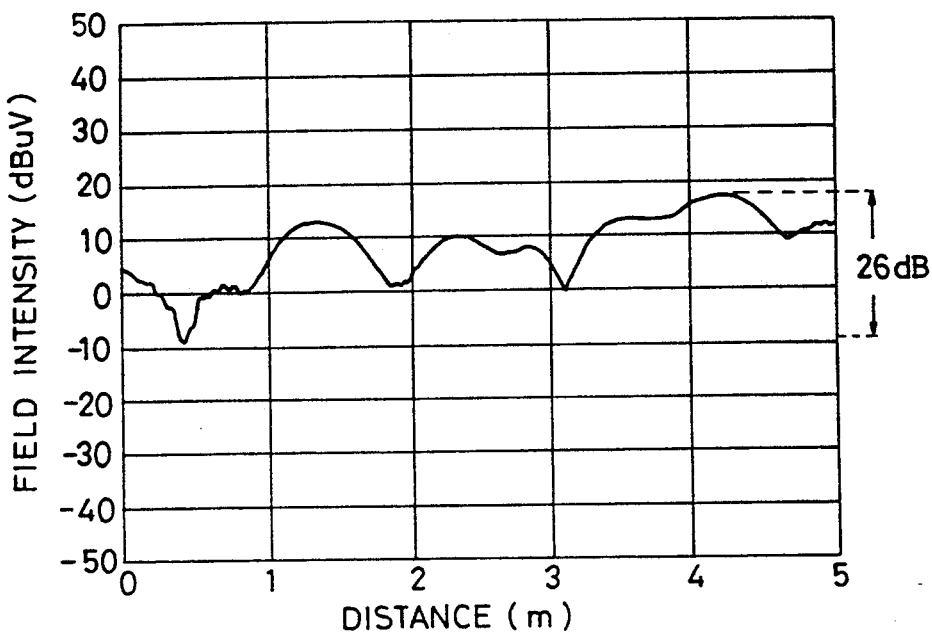
Figure 6:
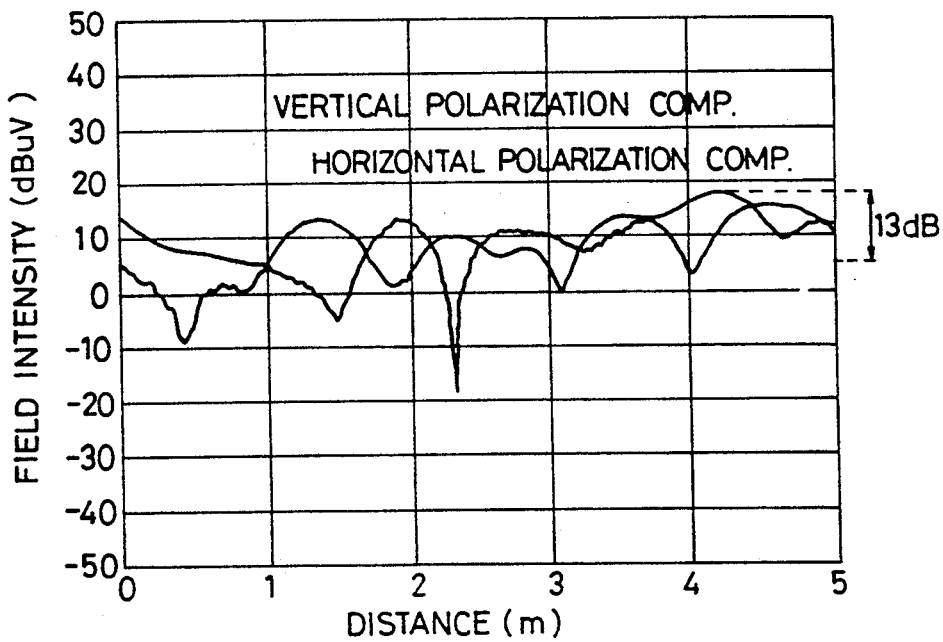

When the transmission antenna 11H is selected and the main polarization component of the transmitted set of the data is made horizontal, the field intensity distribution will be rendered to be as shown in FIG. 4 due to multipath fading, in which the maximum and minimum values of the field intensity involve a difference of 32 dB. When the other transmission antenna 11V is selected and the main polarization component is made vertical, then the field intensity distribution will be as shown in FIG. 5 due to the multipath phasing, where the maximum and minimum field intensity values involve a difference of 26 dB. Therefore, so long as the horizontal and vertical polarization components of which the maximum and minimum field intensity values are relatively large are utilized, the difference between the maximum and minimum values of the field intensity will be 13 dB as shown in FIG. 6, and the field intensity distribution can be made more uniform than in the case where only one type of the transmission antennas 11H and 11V is employed, as will be readily appreciated.

In the receiver 20, on the other hand, signal processing is carried out at the signal processing circuit 26 on the basis of the polarization component of a value above a threshold value of the field intensity which can be received so long as only one of the horizontal and vertical polarization components is of the value above the threshold value. Where both polarization components are concurrently above the threshold value, the data of the first frame F1 are processed at the signal processing circuit 26. While the processing is not carried out at the signal processing circuit 26 when both polarization components are of a value below the threshold value, the arrangement according to the present invention is to select one of the polarization components which is larger in field intensity as has been referred to so that the field intensity distribution can be made even, and the probability of non-processing state of the signal processing circuit 26 is made extremely low as will be clear from a following table:

| First Frame F1 | Second Frame F2 | Processing at Circuit 26 |
|---|---|---|
| Below the threshold value | Above the threshold value | Carried out |
| Above the threshold value | Below the threshold value | Carried out |
| Above the threshold value | Above the threshold value | Carried out (for first frame) |
| Below the threshold value | Below the threshold value | Not carried out |

With the receiver 20 disposed within a transmission range of the transmitter 10, the transmitted signals from any part can be received by the receiver 20 and an excellent diversity radio communication system can be realized.

The transmission antennas shall be detailed next. In FIG. 7, there is shown a circuit diagram of the transmission antenna 11H or 11V with which the antenna change-over circuit 12 is made integral. In the present instance, as will be clear when a circuit of FIG. 8 and its equivalent circuit of FIG. 9 are referred to in conjunction, the transmission circuit includes an annular conductor 31 opened at a portion thereof and a tuning capacitor C1 is inserted between both ends at the open portion of the annular conductor 31. Further connected in series to this capacitor C1 is a bypassing capacitor C2 which is set to show a sufficiently low impedance with respect to high frequency signals provided out of the transmission circuit 13, and there are provided at two points of a loop including the annular conductor 31 and the two capacitors C1 and C2 a power-supplying point S1 and a grounding point G1 so that the both points S1 and G1 will be at both ends of the capacitor C2 while the grounding point G1 will be positioned between the both capacitors C1 and C2. An output terminal of the transmission circuit 13 is connected through another capacitor C3 to the power supply point S1, and a diode D1 connected in parallel with the capacitor C1 is connected at its cathode to the grounding point G1, while the diode D1 is connected at its anode and through the annular conductor 31 to a change-over signal line L1 for supplying a bypass current, the line L1 including a bias resistor R1 and being connected to a change-over signal input terminal SS. In this arrangement of the transmission antenna, the bypassing capacitor C2 functions to break in series relationship between the grounding point G1 and the change-over signal line L1 which supplies the bypass current to the diode D1, and the bias resistor R1 is inserted so as to set the bypass current to the diode D1 and is made to have an impedance high enough for rendering any high frequency signal leaking through the current-over signal L1 to be of a negligible level.

When in the foregoing transmission antenna the change-over signal input terminal SS is made open or to be at zero potential, the bias current does not flow to the diode D1, and the impedance of the diode D1 shows a capacitive value of about several pF which is low in the loss. Accordingly, it can be regarded that a capacitor due to an equivalent capacity of the diode D1 is connected in parallel with the tuning capacitor C1, and, with a composite capacity considered to be CO, an equivalent circuit considered in view of the high frequency signal will be as shown in FIG. 9. When the antenna is so set as to achieve the tuning at the value of the composite capacity CO, the antenna can function as a small loop antenna.

When a predetermined voltage is applied to the change-over signal input terminal SS, on the other hand, the bias current is caused to flow to the diode D1, the impedance of the diode D1 becomes equivalent to a small resistance and a small inductive reactance. Accordingly, the composite capacity CO deviates from the capacitive value at which the tuning is attained and a state in which a resistor of a small value is connected in parallel with the capacitor C1, so that the selectivity Q of the loop including the annular conductor 31 is lowered to increase the loss and the operation as the transmission antenna is stopped.

Such antenna operation of the transmission antenna 11H or 11V is to be made on and off by means of the presence and absence of a voltage application to the change-over signal input terminal SS. In the case of ON, the loss at the diode D1 upon the biasing off is small and the diode D1 can be regarded substantially as a capacitor so that the loss can be made extremely small. In the event of OFF, the resonance point is deviated in the loop including the annular conductor 31 and the selectivity Q of this loop is lowered as has been referred to, whereby the ON/OFF ratio can be taken large.

Referring again to FIG. 7, the transmission antenna of the foregoing arrangement is provided in a pair of antennas 11H and 11V which are connected in parallel relationship to each other, to the transmission circuit 13, to the change-over signal input terminal SS, and to the transmitter 10 according to the present invention as shown in FIG. 1. The antenna change-over input signal is applied to the terminal SS to be provided, more concretely, through a logic circuit comprising inverters I1 and I2 to the respective transmission antennas 11H and 11V. The logic circuit is so formed as to selectively actuate the two transmission antennas with respect to a theoretical value of each of the antenna change-over signal which comprises binary signals, and the antenna change-over circuit 12 is to be formed by the logic circuit and diode D1. In FIG. 7, the transmission antennas 11H and 11V are formed identical to each other except that they are arranged to show mutually different polarization components, and respective constituents of the antenna 11V are denoted by the same reference numbers as those assigned to the foregoing constituents of the antenna 11H but respectively with an addition of 10.

More concretely, the transmission antennas 11H and 11V are mounted to a proper mounting surface, as shown in FIG. 10, so that their antenna loops respectively including the annular conductor 31 or 41 will intersect each other at right angles and thus their main polarization components also will intersect each other perpendicularly. Referring now to FIG. 11, there is shown another working aspect of the transmission antenna employed in the present invention, in which the transmission antenna 11H$a$ or 11V$a$ comprises an annular conductor 31$a$ including a series circuit of a capacitor C1$a$ and diode D1$a$ connected across both ends at an open portion of the conductor, and a change-over signal line L1$a$ for providing the bias current to the diode D1$a$ is connected through a biasing resistor R1$a$ to anode side of the diode D1$a$. A predetermined-voltage application to a change over signal input terminal SS$a$ of this transmission antenna causes the impedance of the diode D1$a$ to become equivalent to a small resistance and a slight inductive reactance as will be clear when an equivalent circuit with respect to the high frequency signal as shown in FIG. 12 is also referred to. In the drawing, the inductive reactance component is not shown as being regarded to be contained in the inductance of the loop including the annular conductor 31$a$. In the loop, further, a small transmission antenna having a certain extent of loss resistance is formed, but such loss can be made almost negligible by means of the diode D1$a$ which shows excellent ON characteristics. Therefore, so long as tuning for the capacitor C1$a$ is performed upon feeding of the bias current, the antenna can be effectively employed as a small transmission antenna.

In this case, too, the zero potential or the opening of the change-over signal input terminal SS$a$ renders the impedance of the diode D1$a$ to show the capacitive reactance which is of such capacity value of less than several pF that causes the resonance point of the loop including the annular conductor to be deviated, whereby the loop is made to be of a high impedance with respect to circulating current of the loop and stops substantially the operation as the antenna. Accordingly, the transmission antenna of the present instance also carries out the ON and OFF operation in response to the presence or absence of the voltage applied to the change-over signal input terminal SS$a$ and the antenna operation is to be made ON and OFF by varying the resonating state with the ON and OFF of the bias current to the diode D1$a$ so that, when the antenna is regarded as a switch, it will be possible to render the ON/OFF ratio to be large and to reduce any loss at ON time with an optimum selection of the diode D1$a$.

When the transmission antennas 11H$a$ and 11V$a$ of the foregoing arrangement are connected to be parallel to each other with respect to the transmission circuit 13$a$ and change-over signal input terminal SS$a$ as shown in FIG. 13, it is possible to realize the same transmitter as in the embodiment of FIG. 7 and to achieve the same function. Further, as required, it is possible to substitute such transmission antennas 11H$b$, 11V$b$ or 11H$c$, 11V$c$ as shown in FIG. 14 or 15 for the transmission antennas of FIG. 11, in the former antennas of which the connection of the diode D1$b$ or D1$c$ and the change-over signal input terminal SS$b$ or SS$c$ is altered.

Figure 16:
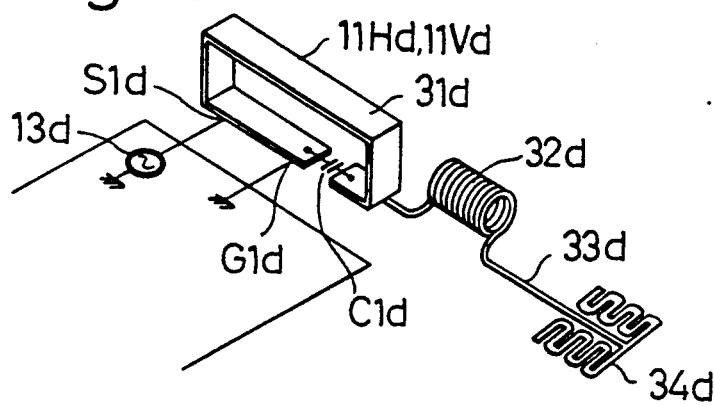
FIG. 16 is a schematic perspective view of the transmission antennas in still another working aspect in the transmitter employed in the system according to the present invention.

Referring now to FIG. 16 showing another working aspect of the transmission antenna employed in the present invention, the transmission antennas 11H$d$ and 11V$d$ comprise respectively a strip-shaped annular conductor 31$d$ opened at one portion, and a tuning capacitor C1$d$ is inserted between both ends of the conductor 31$d$ at the open portion. In this annular conductor 31$d$, there are provided respectively at different positions the power-supplying point S1$d$ and grounding point G1$d$, an air-core coil 32$d$ is connected at its one end to another position of the conductor 31$d$ than the power-supplying and grounding points S1$d$ and G1$d$, and at the other end to a conductive wire 33$d$ and loading 34$d$. In this case, the length of the conductive wire 31$d$ can be made shorter by sequentially providing thereto the loading 34$d$. For this loading 34$d$, it may be possible to employ one of various shapes, while in the aspect of FIG. 16 or FIG. 17($a$), there is employed one formed by dividing an end of the conductive wire 33$d$ into two in T-shape and extending both divided ends backward along the wire 33$d$ while turning toward and away from the wire 33$d$ in zigzag shape on both sides of the wire 33$d$.

For the loading 34$d$, further, it may be possible to employ such simply T-shaped one as in FIG. 17($b$), such substantially T-shaped one having both divided ends in zigzag form as in FIG. 17($c$), such substantially L-shaped one having straight or zigzag end as in FIG. 17($d$), 17($e$) or 17($f$), or such annular crown-shaped one as in FIG. 17($g$). If the provision of only the conductive wire 33$d$ suffices the purpose, the loading 34$d$ may of course be omitted to have the wire 33$d$ terminated straight as in FIG. 17($h$).

Figure 18:
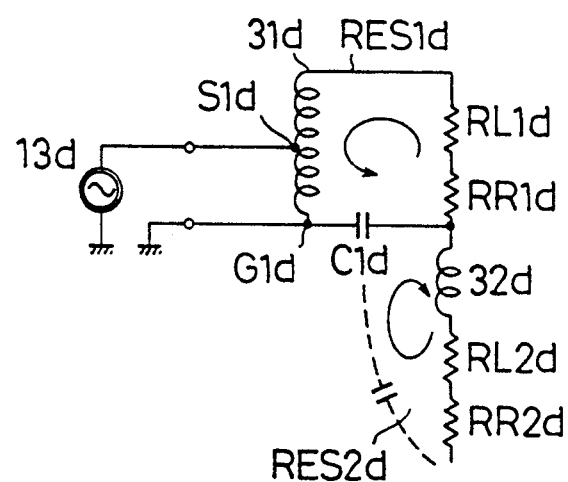
FIG. 18 is an equivalent circuit diagram of the transmission antennas of FIG. 16.
Figure 17A:
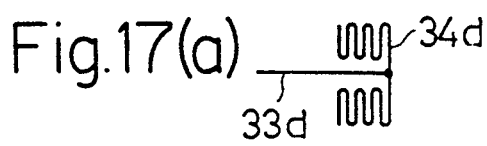
FIGS. 17(a) to 17(h) are schematic plan views showing a variety of loading manners of the transmission antennas of FIG. 16.
Figure 17B:
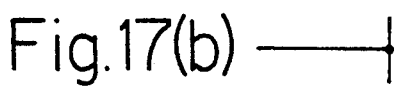
Figure 17C:
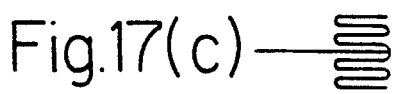
Figure 17D:
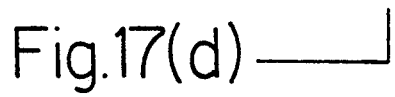
Figure 17E:
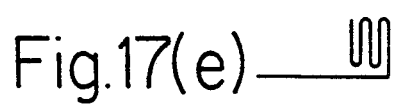
Figure 17F:
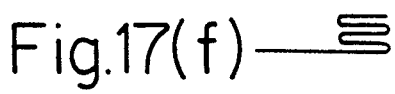
Figure 17G:
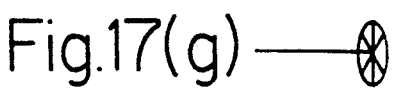
Figure 17H:
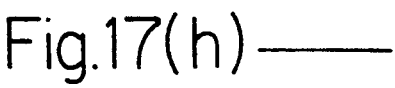

In respect of the transmission antenna 11H$d$ or 11V$d$ of FIG. 16, such an equivalent circuit as in FIG. 18 may be considered, in which event a first resonance circuit RES1$d$ is formed by the annular conductor 31$d$ and capacitor C1$d$ so that the circuit will have a resonance frequency determined by the inductance of the annular conductor and the capacity of the capacitor, and the power-supplying point S1$d$ is set to be at a position where impedance matching with any circuit connected thereto can be attained. Therefore, when the power is supplied from the transmission circuit 13$d$, the circulating current is fed to the first resonance circuit RES1$d$ upon occurrence of resonance and supplied energy from the transmission circuit 13$d$ is consumed at loss resistance RL1$d$ and radiation resistance RR1$d$. AT this time, a loss component due to the radiation resistance RR1$d$ is to be radiated into the space, that is, a contracted loop antennas is to be formed by means of the annular conductor 31$d$ and capacitor C1$d$.

On the other hand, there is formed a second resonance circuit RES2$d$ by means of an inductance of the air-core coil 32$d$ and conductive wire 33$d$ as well as a capacity component between the annular conductor 31$d$ and the conductive wire 33$d$. If the foregoing contracted loop antenna is in the resonance state at this time, the maximum potential in the first resonance circuit RES1$d$ is caused to occur at a point on opposite side of the grounding point G1$d$ with respect to the capacitor C1$d$, $l$ and the air-core coil 32$d$ is connected at an end to this maximum potential point. Accordingly, an energy from the first resonance circuit RES1$d$ is supplied to the second resonance circuit RES2$d$, and the air-core coil 32$d$ and conductive wire 33$d$ function as a monopole antenna in an event where the air core coil 32$d$ and conductive wire 33$d$ are so set as to have the both resonance frequencies of the first and second resonance circuits RES1$d$ and RES2$d$ coincided with each other.

That is, when the power supply is carried out from the first resonance circuit RES1$d$ to the second resonance circuit RES2$d$, the power is consumed at the loss resistance RL2$d$ and radiation resistance RR2$d$, and the loss component at the radiation resistance RR2$d$ is radiated to the space, whereby the present transmission antennas 11H$d$ and 11V$d$ are made to be equivalent to a case where the contracted loop antenna and contracted monopole antenna are concurrently employed. Accompanying the operation of the second resonance circuit RES2d, here, a current flows to a part of the first resonance circuit RES1d and, when the both resonance circuits are made to be of the same resonance frequency, the first resonance circuit RES1d is to be provided with a constant different from that when the same is employed alone.

Referring to the operational characteristics of the transmission antennas 11Hd and 11Vd of the present working aspect, it should be assumed here that the first resonance circuit RES1d is a microloop antenna, the second resonance circuit RES2d is a microdipole antenna (dipole antenna is a modification of the monopole antenna), the characteristics of the transmission antennas 11Hd and 11Vd are approximated to composite characteristics of the microloop and microdipole antennas, and the radiation fields from the microloop and microdipole antennas are in equiphase. Referring here to FIG. 19, the microdipole antenna 36d is disposed to be in parallel including the microloop antenna 35d so as to correspond to the foregoing positional relationship between the transmission antennas 11Hd and 11Vd, then the both antennas are to show such directivities as shown in FIGS. 20(a) to 20(c) and FIGS. 21(a) to 21(c). When it is so arranged that the polarization components present in the same direction are to be added to each other but those present in directions mutually intersecting at right angles are kept independent of each other, then the composite directivity of the both antennas will be as shown in FIGS. 22(a) to 22(c). The composite directivity represented by electric power pattern with a unit of dB will be as in FIGS. 23(a) to 23(c) so that the maximum/minimum ratio will be about 4 dB, and it will be possible to render the transmission antennas 11Hd and 11Vd to be substantially isotropic in the directivity. In FIGS. 20 through 22, further, solid lines denote that the polarization components which are vertical to the plane of the drawings while dotted lines denote the components parallel to the plane. Further, the transmission antennas 11Hd and 11Vd of the present embodiment can be formed by means of conductive pattern of printed circuit board.

Figure 24:
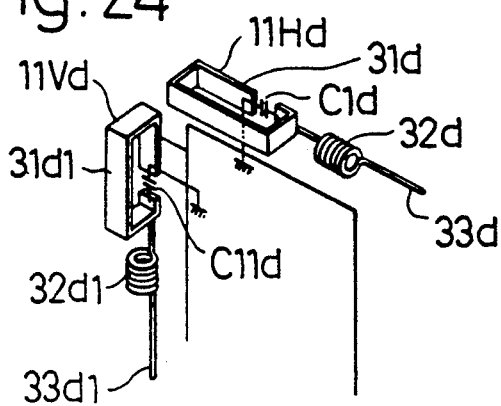
FIG. 24 is a fragmentary perspective view showing main part of the transmitter employing the transmission antennas of FIG. 16.
Figure 25:
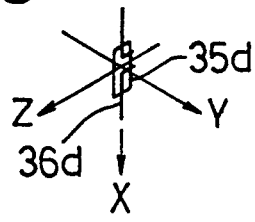
FIG. 25 is a schematic explanatory view for one of the transmission antennas in the transmitter of FIG. 24.
Figure 27:
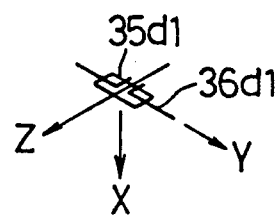
FIG. 27 is a schematic explanatory view for the other transmission antenna in the transmitter of FIG. 24.
Figure 26A:
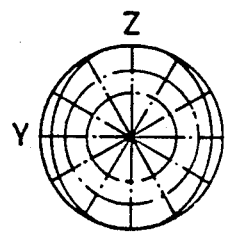
FIGS. 26(a) to 26(c) are explanatory views for the operation of the transmission antenna of FIG. 25.
Figure 28A:
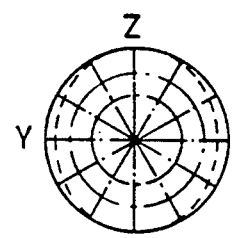
FIGS. 28(a) to 28(c) are explanatory views for the operation of the transmission antenna of FIG. 27.
Figure 26B:
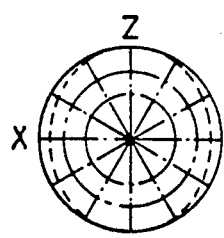
Figure 28B:
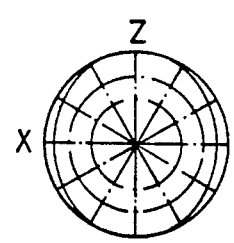
Figure 26C:
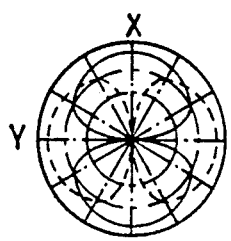
Figure 28C:
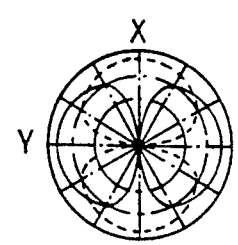

Now, the transmission antennas 11Hd and 11Vd of the foregoing arrangement are so disposed that, as shown in FIG. 24, the planes including the annular conductors 31d and 31dl will intersect each other at right angles, and the respective polarization components of the microloop antennas 35d, 35dl and the microdipole antennas 36d, 36dl in the both transmission antennas 11Hd and 11Vd are thereby made to mutually intersect at right angles. In this event, the transmission antennas 11Hd and 11Vd are connected through the antenna change-over circuit 12 to the transmission circuit 13 so that, as will be clear when FIGS. 25 and 26(a) to 26(c) and FIGS. 27 and 28(a) to 28(c) are jointly referred to, the transmission signals in two sets having the polarization components different by 90 degrees from each other can be transmitted out of the transmission antennas 11Hd and 11Vd and the polarization diversity radio communication system can be realized. In the present invention, further, it is possible to employ various design modification. For example, while the polarization diversity radio communication system is realized in the foregoing embodiments by changing over the two transmission antennas 11H and 11V the main polarization components of which mutually intersect at right angles, the system can also be realized by using more than three transmission antennas in combination, and their main polarization components of the respective transmission antennas may not be always intersecting one another at right angles.

What is claimed is:

1. A polarization diversity system suitable for radio communication in indoor space, comprising:

a transmitter including a plurality of transmission antennas of different main polarization components, at least two of said transmission antennas being so disposed that their main polarization components intersect each other at right angles;

a transmission circuit connected to said transmission antennas;

an antenna change-over circuit between said transmission antennas and said transmission circuit which connects the transmission circuit to each of said transmission antennas for transmitting a series of data through each of the transmission antennas having different polarization components; and a receiver remote from said transmitter including a means for receiving electromagnetic waves consisting of a single reception antenna the series of data transmitted through each of the transmission antennas having different polarization components;

wherein said transmitter and said receiver are disposed at mutually remote positions in indoor space such that the transmitter transmits the series of data antennas, the series of data transmitted through each of the transmission antennas being propagated through any one of a plurality of propagation paths produced in the indoor space at different timing with different polarization components and the receiver reproduces the series of data transmitted from the transmitter through any one of the following of transmission antennas through one of said propagation paths in the indoor space and received through the single reception antenna.

2. A polarization diversity system suitable for radio communication in indoor space, comprising:

a transmitter including a plurality of transmission antennas of different main polarization components, at least two of the transmission antennas being so disposed that their main polarization components intersect each other at right angles, each of the transmission antennas including:

(a) an annular conductor discontinued at a portion and having first and second ends at that portion, (b) a tuning capacitor inserted between both ends of the annular conductor at the discontinued portion, (c) an inductance element having first and second ends and connected to the annular conductor at the first end of the inductance element, (d) a conductive wire having first and second ends and connected at the first end to the second end of the inductance element and discontinued at the second end of the wire, and (e) power-supplying and grounding points provided on the annular conductor, the annular conductor and conductive wire being disposed for producing a radiation from the annular conductor and a further radiation due to spatial coupling between the annular and conductive wire and for achieving substantially isotropic composite directivity;

a transmission circuit connected to said transmission antennas;

an antenna change-over circuit between said transmission antennas and said transmission circuit which connects the transmission circuit to a selected one of said transmission antennas for transmitting a series of data through each of the transmission antennas; and a receiver remote from said transmitter including a single reception antenna;

wherein said transmitter and said receiver are located at mutually remote positions in indoor space such that the transmitter transmits the series of data sequentially through a selected one of the transmission antennas, and the receiver reproduces the series of data when the data transmitted from the transmitter through any one of the plurality of transmission antennas are received through the single reception antenna.

3. A system according to claim 2 wherein each of said transmission antennas includes antennas loops which intersect each other perpendicularly, thus causing their respective polarization components to intersect each other perpendicularly.

4. A system according to claim 2 wherein each of said transmission antennas include:

a diode connected to said tuning capacitor for allowing said antenna change-over circuit to determine ON and OFF operation of the antennas by means of a biasing current to said diode.

5. A system according to claim 4 wherein said diode is connected in parallel with said tuning capacitor for carrying out the ON and OFF operation of said antennas in response to said biasing current fed to said diode.

6. A system according to claim 4 wherein said diode is connected in series with said tuning capacitor for turning said antennas ON and OFF in response to said biasing current fed to the diode.

* * * * *

UNITED STATES PATENT AND TRADEMARK OFFICE
CERTIFICATE OF CORRECTION

PATENT NO.  : 5,280,631
DATED       : January 18, 1994
INVENTOR(S) : Nakahi et al.

It is certified that error appears in the above-indentified patent and that said Letters Patent is hereby corrected as shown below:

Col. 10, line 24, after "antenna" insert --for--.
Col. 10, line 29, after "data" insert --sequentially through each of the transmission--.
Col. 10, line 36, change "following" to --plurality--.
Col. 11, line 19, change "antennas" (second occurrence) to --antenna--.
Col. 12, line 9, after "current" insert --applied--.

Signed and Sealed this

Twelfth Day of July, 1994

Attest:

BRUCE LEHMAN

*Attesting Officer*  *Commissioner of Patents and Trademarks*